Dec. 10, 1968    J. W. LIPNITZ    3,416,035
RECLOSER STATIC CONTROL CIRCUIT
Filed Jan. 21, 1966    6 Sheets-Sheet 5
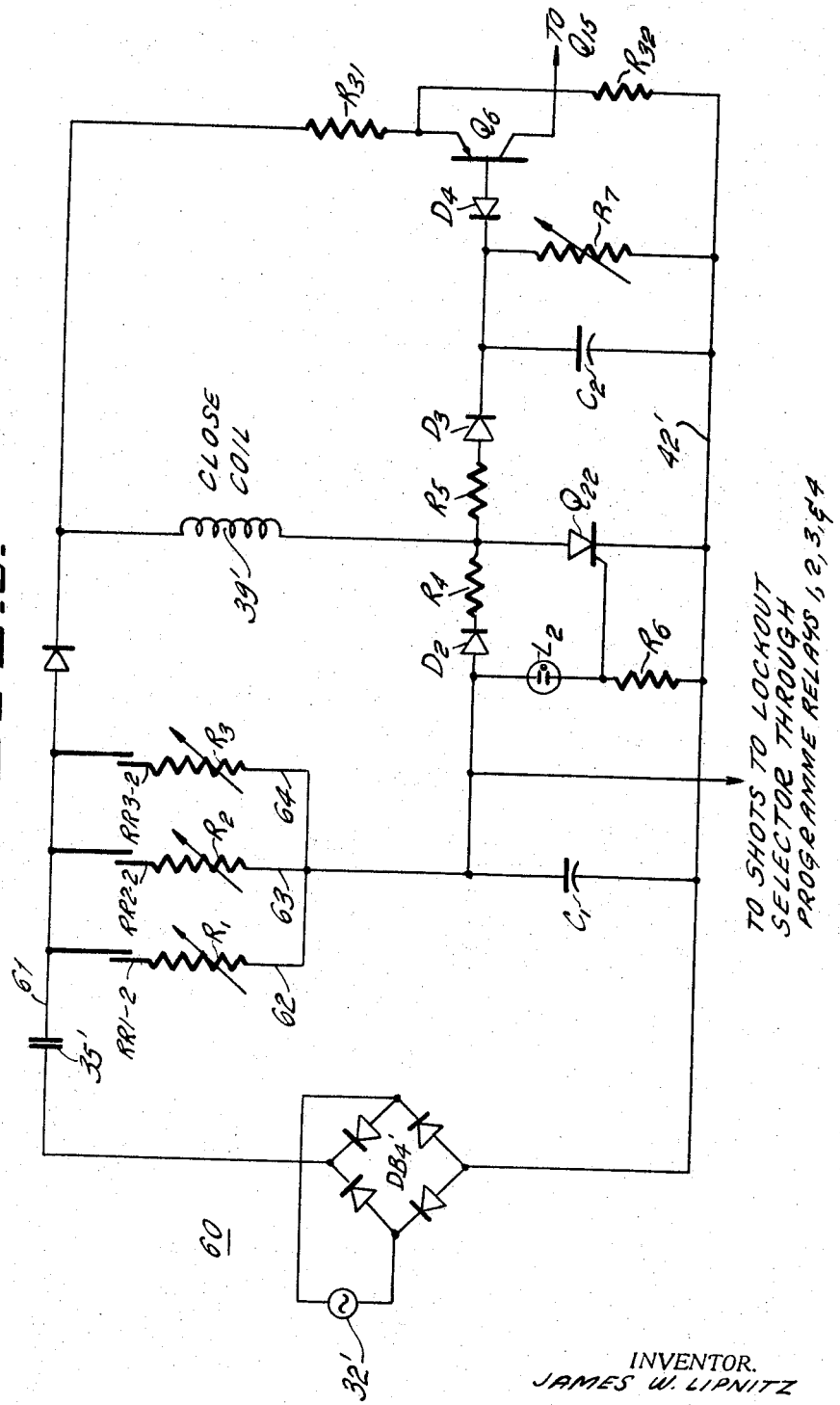
INVENTOR.
JAMES W. LIPNITZ
BY
OSTROLENK, FABER, GERB & SOFFEN
ATTORNEYS

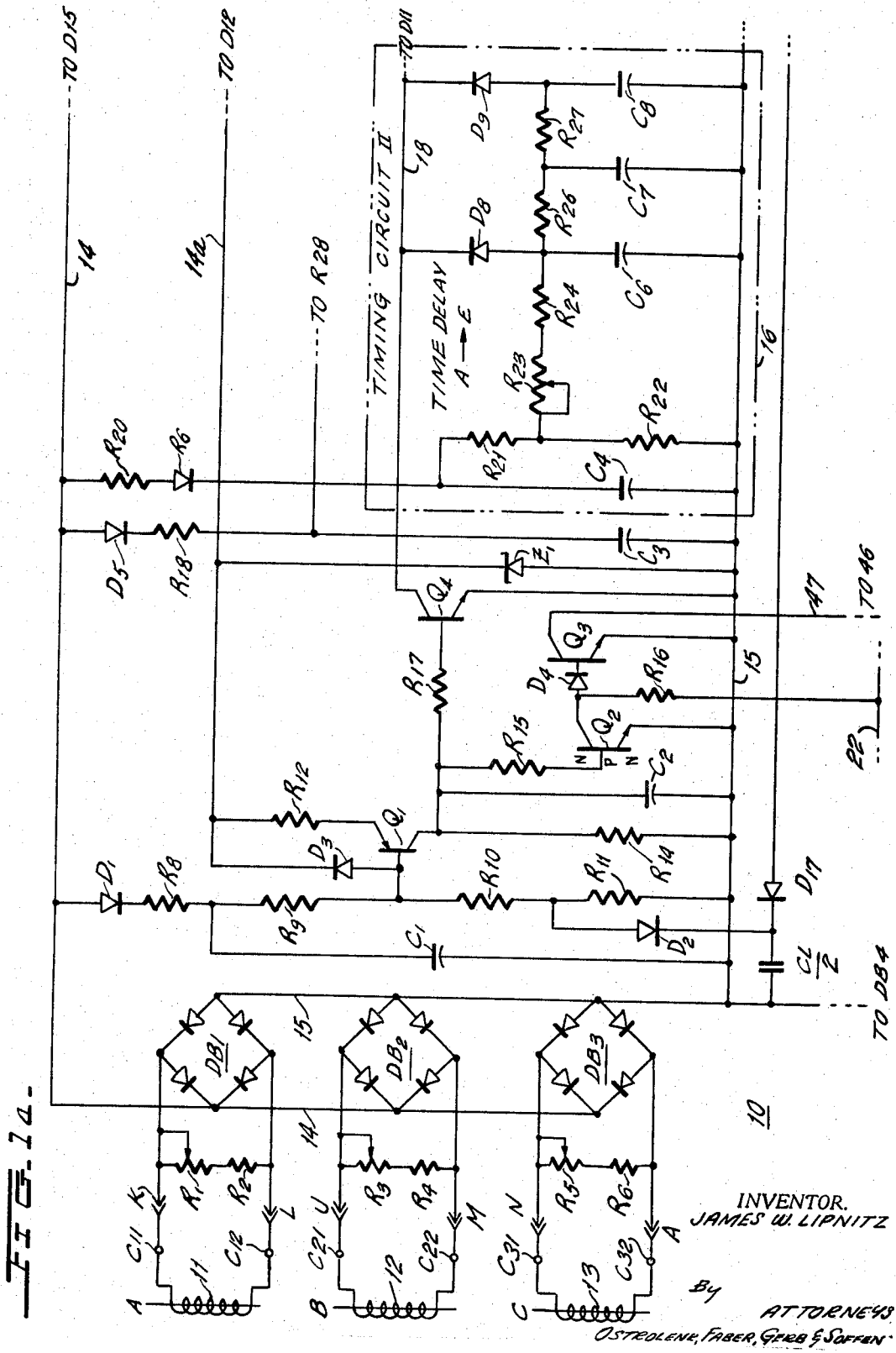

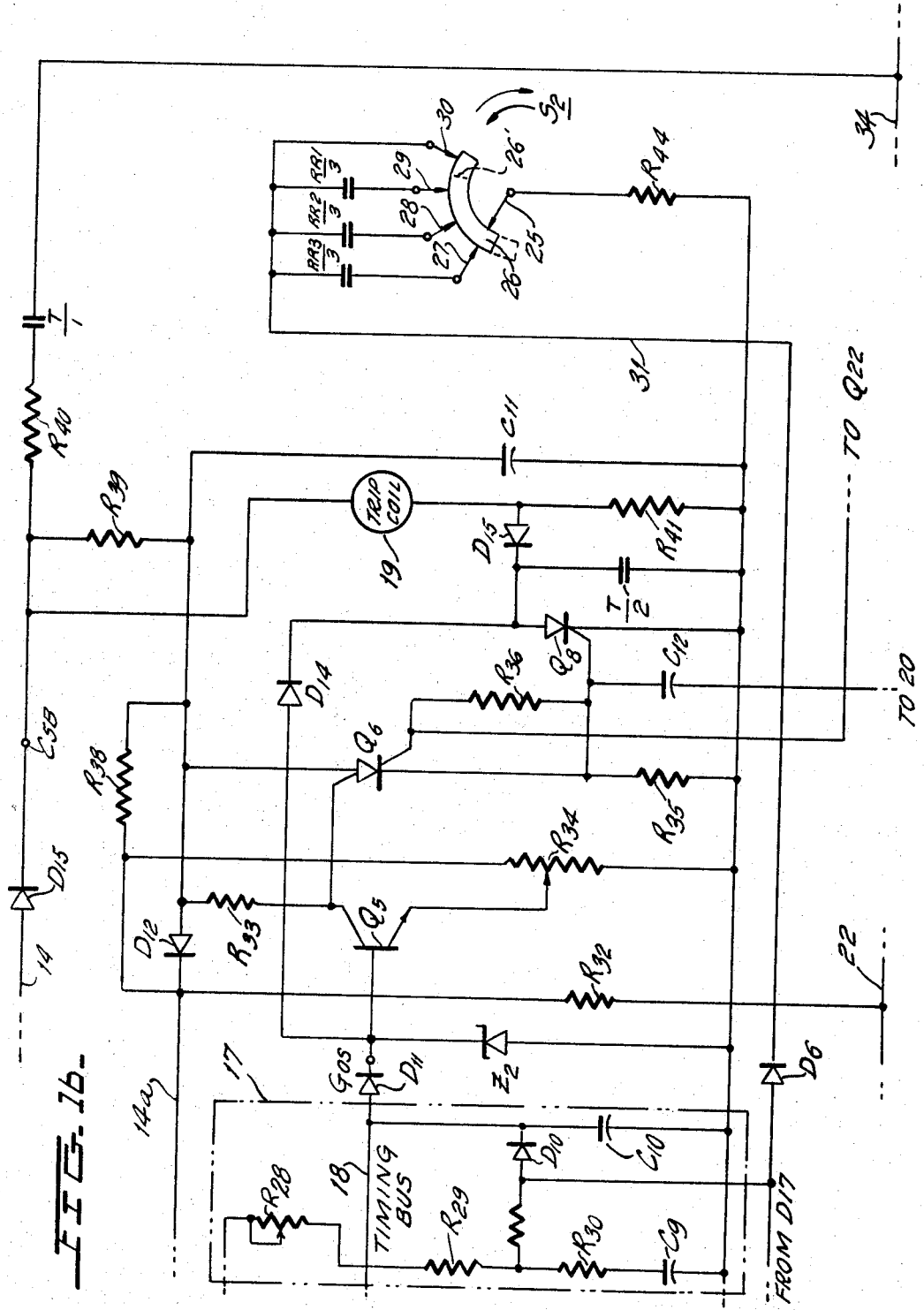

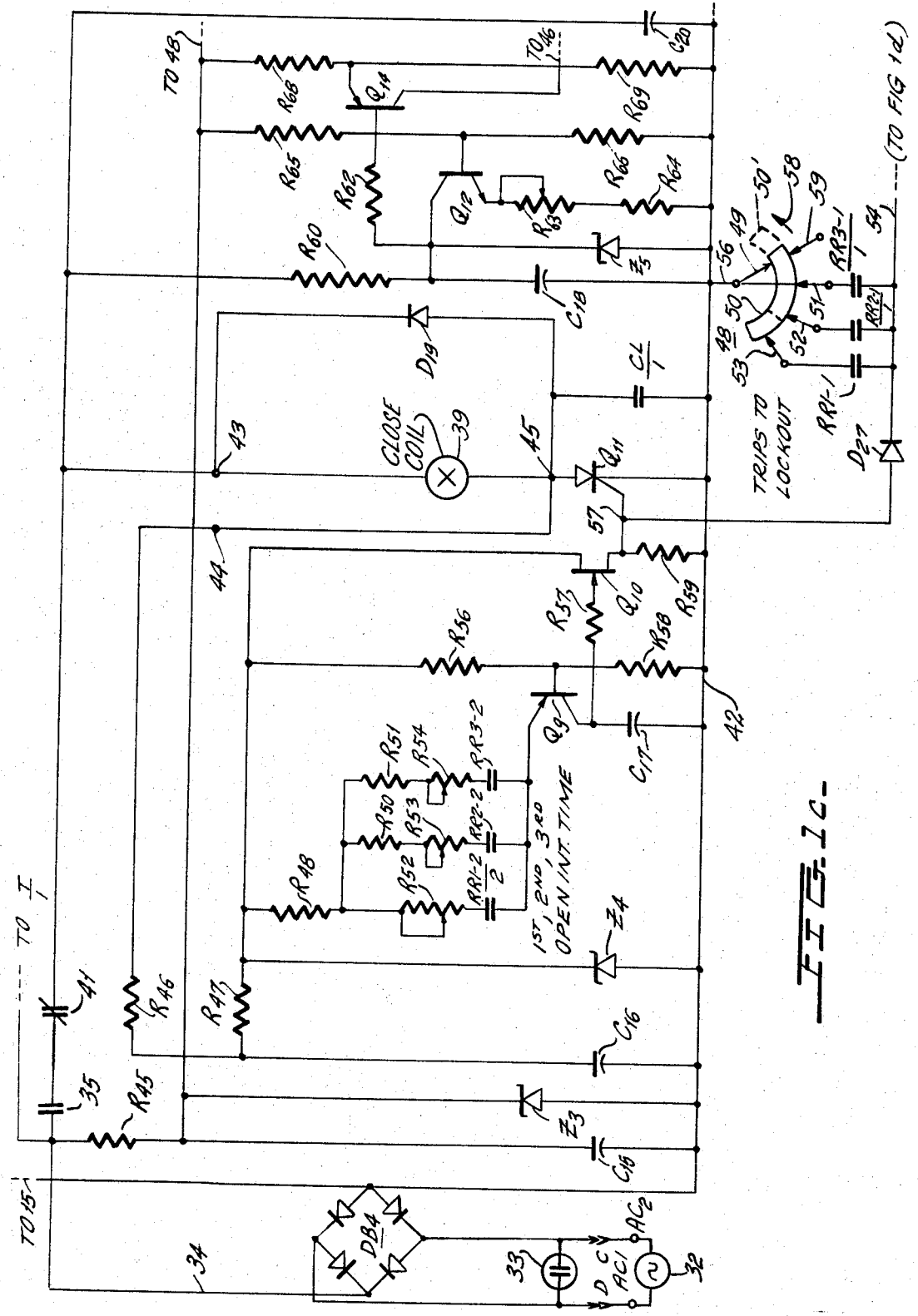

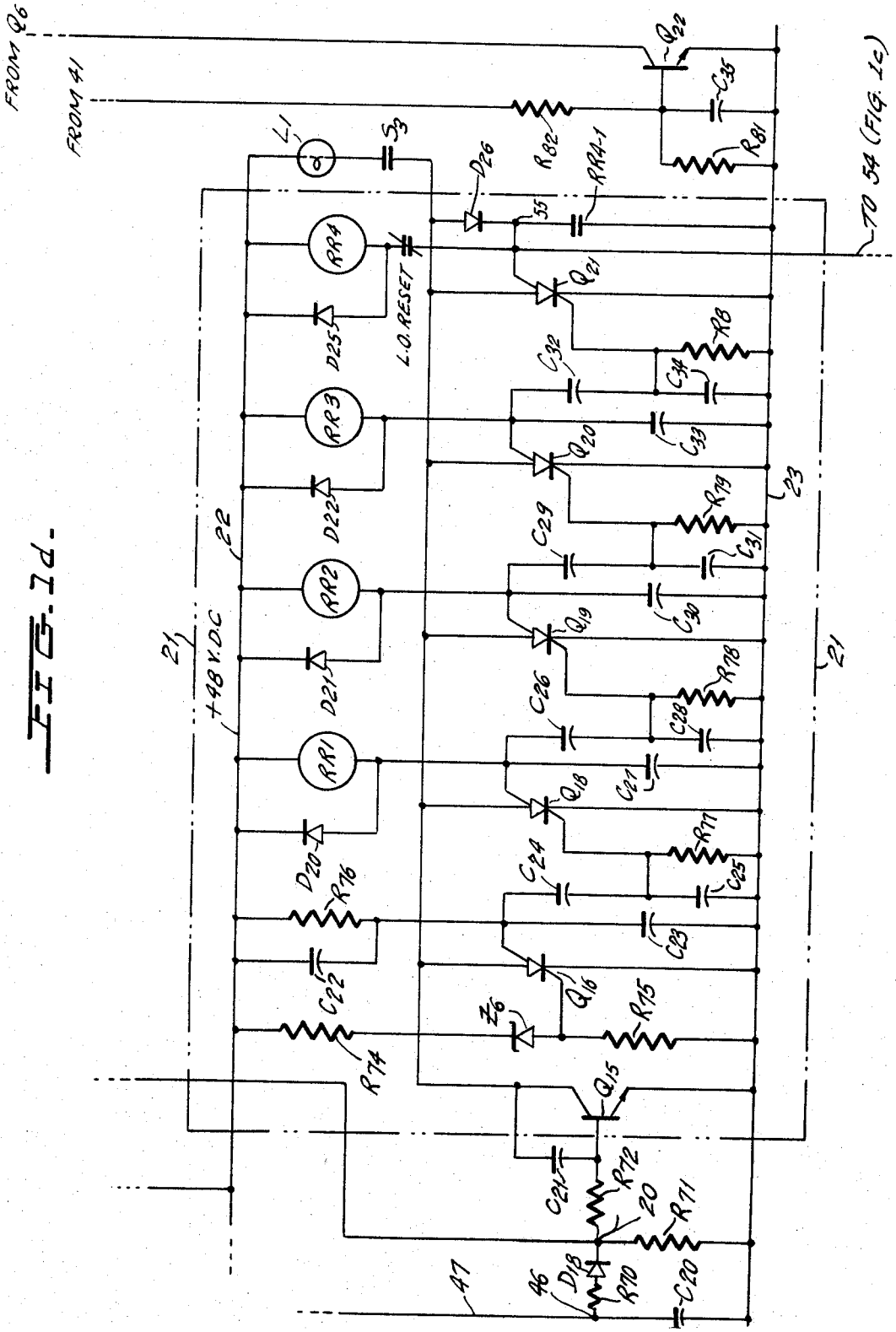

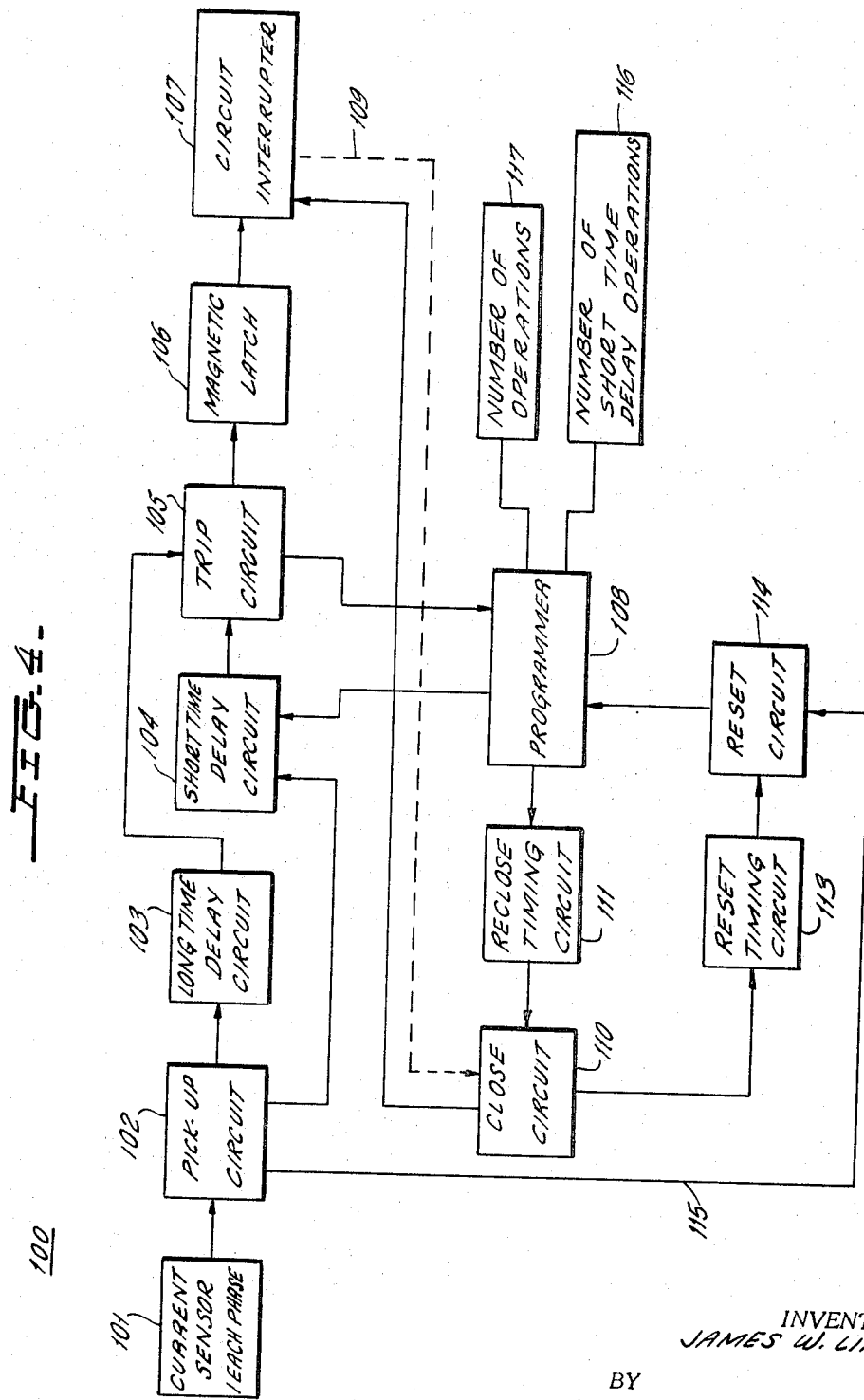

United States Patent Office 3,416,035
Patented Dec. 10, 1968

3,416,035
RECLOSER STATIC CONTROL CIRCUIT
James W. Lipnitz, Cherry Hill, N.J., assignor to I-T-E Circuit Breaker Company, Philadelphia, Pa., a corporation of Pennsylvania
Filed Jan. 21, 1966, Ser. No. 522,185
11 Claims. (Cl. 317—22)

ABSTRACT OF THE DISCLOSURE

A recloser static control circuit controlling the operation of an interrupter capable of tripping after time delays inversely proportional to the current magnitude in the circuit being protected. Current magnitude in the circuit being protected is sensed and converted to a D.C. level. The D.C. level is applied to a pair of timing circuit of differing time delays coupled between the current sensing portion and a tripping device. Under normal operation the timing circuit which times out fastness controls the tripping operation. Automatic programming means are provided for keeping a count of the number of trip and automatic reclosing operations performed in order to disable the fast time delay circuit and place the tripping operation under control of the slower timing circuit. A pick-up circuit is provided for initially disabling both timing circuits until a predetermined minimum critical current magnitude is achieved to prevent the timing circuits from timing out under normal current conditions. The static control circuitry is further provided with adjustable time delay means for controlling the time delay between a tripping operation and a subsequent reclosing operation. The programming means automatically controls the recloser timing circuit to modify the time delay before reclosure in accordance with the number of tripping operations which have already been performed. Manually operable means are provided for controlling the time at which the programming circuit disables the fast timing circuit in the trip circuitry section as well as for controlling the adjustment of the time delay in the reclosing timing circuit. Adjustable means are provided for causing the interrupter to go to lock-out after any predetermined number of trip operations, depending upon the setting of the programming means. Further means are provided for automatically resetting the programmer to its initial state after a fault has been cleared and remains cleared for a predetermined time interval. Overriding circuit means are provided for preventing the reset of the programming means to its initial state if, after a reclosure operation, there is an indication that a critical current condition still exists in the circuit being monitored.

---

The instant invention relates to control circuitry and more particularly to static control circuitry for use in power distribution systems and which provide for both the programmed tripping and reclosing of a power circuit being protected.

In the practical operation of electrical distribution systems it is most desirable to maintain constant electrical service to customers in the system. Such power distribution systems are frequently exposed to faults of a transient nature such as, for example, lightning strikes, falling tree limbs, birds carrying conductive materials, to mention just a few. Such transient faults require momentary interruption of the circuit and then a re-establishment of service when the abnormal situation is cleared. Sometimes it may be necessary to attempt reclosure two or more times before the faulty condition is cleared. Additionally, should the fault be a permanent one, i.e., where the wires of the power distribution network are down because an automobile has struck a power pole, or the wires have been downed by high winds, icing, and so fourth, the power to that section of the line must be cut off to prevent damage to property and hazard to life.

The instant invention is characterized by providing a static control circuit which, when coupled to a suitable circuit breaker will automatically detect the fault and proceed through a pre-programmed series of attempts to clear the fault and if these attempts prove unsuccessful, to move the circuit to the lock-out position. If the faulted condition is eliminated during the program the control circuitry will automatically reset to the first program step. In addition, the circuit design is such as to provide a high degree of flexibility. For example, both slow and fast tripping delay times are provided with each being selectable by simple manual means and with a selection of as many as three open-time intervals, each individually adjustable and with an adjustable reset period, as well as a control to program the number of operations in each of the slow or fast trip delay circuits and a control to select the number of attempts to re-establish service before locking the circuit in the open state in the presence of a permanent fault. Adjustable pick-up control means are provided in each phase (of the three-phase system, for example) to permit individual determination of what level will constitute a fault condition in each phase. The system, however, works equally well in power distribution networks having greater or lesser than three phases. The system also has the ability to automatically trip the circuit breaker from fault current energy alone and further has the ability to restrain reset of the program steps while the fault level current is still present in the circuit.

In addition to all the above distinct advantages, the static recloser control circuit is comprised of all solid state devices so as to require no filament voltage to provide extremely high speed operation due to the fact that effectively no mechanical devices are employed and further to provide an extremely long useful operating life due to the inherent nature of such static solid state elements.

The instant invention is comprised of suitable current-sensing devices which are inductively coupled to each phase of the system for coupling the current flowing at each phase to the static recloser control circuit. The output of each current-sensing device is fullwave rectified to convert the current in each phase to a substantially D.C. voltage representative of the current magnitude in its associated phase. The outputs of the rectifying devices for each phase are coupled in common to the input of a pick-up circuit which prevents operation of the slow or fast time-delay circuits during the time in which normal current flow exists within the power distribution system. As soon as the current flow in any one of the three phases exceeds a predetermined level the pick-up circuit operates to enable both a slow and a fast time-delay circuit to simultaneously time-out. Manually settable switch means are provided for disabling the fast timing circuit from operating or for selecting the number of fast trips desired. As soon as one of the time-delay circuits has been permitted to time-out a voltage of a suitable level is developed by the timing circuit sufficient to energize a trip coil for the purpose of tripping the circuit breaker.

A programming circuit is provided which has its input electrically coupled to the output of the timing circuit supplying the tripping signal for the purpose of setting the programming means to the second programmed step.

A recloser timing circuit is also provided, which timing circuit is normally deenergized and becomes energized under control of suitable switch means, which switch means closes as soon as the breaker moves to the open position. The reclosing timing circuit is designed to energize a close coil a predetermined time period after the first tripping operation has occurred. The recloser timing circuit is provided with manually adjustable switch means for selectively adjusting the reclosing time-delay desired. Each successive reclosing step, if more than one reclosure is required, may be adjusted to be of a different time interval.

As one example, let it be assumed that if fault current is detected causing the pick-up circuit to cause either one of the two trip-time delay circuits to time-out. As soon as the first time-delay circuit times-out a trip pulse causes the trip coil to be energized tripping the circuit breaker. This trip pulse also causes the program to step from step 1 to step 2. The tripping of the circuit breaker moves it to the open position causing the recloser timing circuit to become energized. A predetermined time period after energization the recloser timing circuit develops a closing signal causing the closing coil to become energized, thereby reclosing the circuit breaker. The recloser timing circuit also develops a signal which resets the programmer back to step 1 if no fault current appears on the line during this timing interval.

If, after reclosure of the circuit breaker, fault current is still present on the line this fault current is impressed upon electronic gating means which inhibits the recloser timing circuit from resetting the program back to step 1. The second tripping operation causes the breaker to move to the open position thereby energizing the recloser timing circuit for the second time. A second predetermined time interval then elapses after which the closed coil is again energized by the recloser timing circuit and the recloser timing circuit again attempts to reset the programmer back to step 1. If fault current is still present on the line the fault current condition will inhibit the recloser timing circuit from resetting the programmer back to step 1 and a third tripping operation will occur. After a predetermined number of program steps have occurred with the actual number of program steps being adjustable dependent upon the needs of the user, the programmer will reach its final step causing the circuit breaker to lock into the open position and inhibiting the recloser timing circuit from any further reclosures of the circuit breaker. The static recloser control circuit is highly flexible in that a variety of combinations of slow and fast trip time-delays may be selected, a variety of slow, medium and fast recloser time-delays may be selected, and the number of program steps which the control circuit will run through before lock out is also simply and easily adjusted. All of the circuit elements are static solid state devices providing extremely fast and reliable service as well as extremely long useful operating lives due to the fact that there are no moving parts within the recloser control circuitry.

As an alternative embodiment the recloser timing circuit may be comprised of neon glow lamp means for triggering the operation of a silicon controlled rectifier in accordance with a time-delay period selectively adjustable by means of the recloser timing switch means.

It is therefore one object of the instant invention to provide a novel static recloser control circuit for use in power distribution systems and the like.

Another object of the instant invention is to provide a novel static recloser control circuit for use in power distribution systems and the like and which is comprised of all static solid state elements.

Another object of the instant invention is to provide a novel static recloser control circuit for use in power distribution systems and the like and which is provided with manually adjustable time-delay tripping means.

Still another object of the instant invention is to provide a novel electronic recloser control circuit for use in power distribution systems and the like and which is provided with manually adjustable time-delay tripping means; and manually adjustable time-delay recloser means.

Still another object of the instant invention is to provide a novel static recloser control circuit for use in power distribution systems and the like and which is provided with manually adjustable time-delay tripping means; and manually adjustable time-delay recloser means and further is provided with programmer means which is adjustable to control the number of tripping and reclosing steps which will occur before lock-out of the circuit breaker.

Another object of the instant invention is to provide novel static recloser control circuits for use in power distribution systems and the like and having an adjustable recloser timing delay circuit for the purpose of reclosing the circuit breaker after a predetermined time-delay period and for resetting a programmer circuit to its first program step if there is no fault condition on the line after a predetermined time period.

Another object of the instant invention is to provide novel static recloser control circuits for use in power distribution systems and the like and having an adjustable recloser timing delay circuit for the purpose of reclosing the circuit breaker after a predetermined time-delay period and for resetting a programmer circuit to its first program step if there is no fault condition on the line after a predetermined time period and further comprising gating circuitry for inhibiting resetting of the programmer means by the recloser timing delay circuit if a fault current is present on the line before the aforementioned time period.

Another object of the instant invention is to provide novel recloser tripping circuits for use in power distribution systems and the like and having adjustable time delay means of different time-current relationships to eliminate the need for auxiliary tripping current supplies by utilizing the energy of the fault current extracted by the current sensor to directly operate the trip coil of a circuit interrupter latch.

These and other objects of the instant invention will become apparent when reading the accompanying description and drawings in which:

FIGURES 1a–1d constitute a schematic diagram showing a static recloser timing circuit designed in accordance with the principles of the instant invention.

FIGURE 2 shows the manner in which FIGURES 1a–1d are related to form the composite control circuit.

FIGURE 3 is a schematic diagram showing an alternative embodiment for the recloser timing circuitry shown primarily in FIGURE 1c.

FIGURE 4 is a block diagram of the circuitry of FIGURES 1a–1d.

Referring now to the drawings and more particularly to FIGURES 1a–1d, the static recloser control circuit 10 is comprised of current transformer means 11, 12 and 13, each being inductively coupled to a conductor of each of the three phases A, B and C, respectively, of the three-phase system. While the embodiment shown in FIGURES 1a–1d will be explained herein for use with the three-phase system, it should be understood that the static recloser control circuitry is equally adaptable for use in systems having a greater or lesser number of phases.

Each of the current transformers are provided with a saturable core which is designed to saturate at a predetermined level in order to limit the volt seconds output of the current transformer so as to protect the recloser control circuitry from damage or destruction by huge overload currents.

Since the output circuit coupled across the terminals of each current transformer 11–13 is substantially identical, only one of these circuits will be described herein for purposes of simplicity. Considering the current transformer 11, a pair of resistances R1 and R2 are coupled across the terminals and act as burden resistors. Resistance R1 is made adjustable for adjustment of the burden impressed upon the current transformer. A fullwave rectifier diode bridge DB1 is coupled across the terminals of current transformer 11 and in parallel with burden resistors R1 and R2. The fullwave rectifier diode bridge acts to convert the A.C. current flowing in phase A to a D.C. voltage level provided for the purpose of operating the static recloser control circuit.

The positive terminals of each of the diode bridges DB1–DB3 are coupled to a common signal bus 14 while the negative terminals are coupled in common to a negative signal bus 15. This arrangement causes the highest developed D.C. voltage to appear across the positive and negative buses 14 and 15. When the positive signal bus 14 is coupled through a diode D15, resistor R39 and diode D12 to one terminal of Zener diode Z1, the opposite terminal of which is coupled to negative signal bus 15, the Zener diode Z1 sets the emitter reference level for transistor Q1.

Also coupled between the positive and negative buses 14 is a series circuit comprised of diode D1 and resistors R8–R11. Resistors R8–R9 and R10–R11 form a voltage divider circuit to establish the voltage level at the base electrode of transistor Q1. Resistor R8 limits the surge current to capacitor C1 and protects diode D1. Under normal current flow in the three phases A–C the voltage level at the base electrode of transistor Q1 is less than the voltaget level at the emitter, causing transistor Q1 to be normally ON. Diode D3, coupled between the emitter and base electrodes provides protection for the transistor from damage due to excessive reverse base-emitter voltage.

With transistor Q1 normally turned ON, the emitter current flow through resistor R14 turns ON transistor Q4 which provides the shunt to ground for preventing the slow and fast time-delay circuits from timing out.

Assuming that a current of a magnitude larger than normal current flow exists in any one or more than one of the three phases A–C, a larger voltage will be developed across the voltage divider comprised of resistors R9 and R10 causing the voltage at the base of transistor Q1 to exceed the emitter voltage. It should be understood that the emitter voltage is clamped due to the presence of Zener diode Z1. This condition drives transistor Q1 into cut-off, removing collector current from resistor R14 and thereby causing transistor Q4 to be turned OFF. This removes the shunt from timing circuits 16 and 17, allowing both of these circuits to time-out. Timing circuits 16 and 17 are comprised of a plurality of resistive and capacitive elements which are designed to develop a voltage level at the timing bus 18 a predetermined time period after the pick-up circuit (which time period will be inversely proportional to the magnitude of the fault current), comprised of transistors Q1 and Q4 permit the timing circuits to begin time-out. The function of the pick-up circuit, therefore, is to prevent the timing circuits from timing out during periods of normal current flow.

The slow time-delay circuit 16, which is now free to time-out is coupled to the positive signal bus through resistor R20 and diode D6. The values of the resistive elements R21–R24, R26 and R27 and capacitors C6–C8 are selected to cause the voltage applied across the time-delay circuit to be developed at the timing bus 18 a predetermined time period after the pickup circuit has become deenergized.

The fast time-delay circuit is coupled to positive signal bus 14 through diode D5, resistors R18, R28 and R29. The elements R30, D10, C9 and C10 have values selected to cause the voltage applied to the fast time-delay circuit 17 to be developed at the timing bus 18 a predetermined time period after the deenergization of the pick-up circuit, but prior to the timing out of the slow time-delay circuit 16. The operation of the slow and fast time-delay circuits and the time current curves for these time delay circuits are set forth in greater detail in copending applications Ser. No. 403,208, entitled Static Overcurrent Relay, filed Oct. 12, 1964 by S.E. Zocholl et al., issued May 9, 1967 as United States Patent 3,319,127, and in copending application Ser. No. 484,928, entitled Static Overcurrent Relay, filed Sept. 3, 1965 by James W. Lipnitz, issued Aug 1, 1967 as United States Patent 3,334,272, both of which applications have been assigned to the assignee of the instant invention and which applications are incorporated herein by reference thereto.

Due to the inherent time-delays of the slow and fast time-delay circuits the voltage across capacitor C10 will rise faster than the voltage across capacitor C6. When the voltage across capacitor C10 exceeds the voltage level set at the emitter of transistor Q5 by the voltage divider comprised of adjustable resistance R34, which is coupled to reference buses 14A and Z1 the transistor Q5 is turned ON. Obviously, if both timing circuits are permitted to time-out simultaneously, the fast time-delay circuit 17 will be the first one to cause transistor Q5 to be turned ON. The driving of transistor Q5 into conduction develops an IR drop across resistor R33. The end terminals of resistor R33 are coupled across the anode and anode gate terminals, respectively, of the silicon controlled switch Q6. This voltage difference across the anode and anode gate terminals turns silicon controlled switch Q6 ON, causing the fully charged capacitor C11 to be discharged through the gate of silicon controlled rectifier Q8. With the silicon controlled rectifier Q8 being turned ON by this capacitor discharge current, the current available from DB-1 is passed through the trip coil 19 causing the circuit breaker (not shown) under control of trip coil 19, to be tripped. The trip coil 19 may preferably be that of a flux shifting magnetic latch as described in copending application Ser. No. 436,578, entitled Rotary Armature Flux Shifting Device, filed Mar. 2, 1965 by Stanely E. Zocholl, issued Jan. 31, 1967 as United States Patent 3,302,146, and assigned to the assignee of the instant invention. However, any other type of latch may be used, if desired.

Thus, it can be seen that the basic circuitry so far described provides a slow and fast time-delay, which time-delay circuits are not permitted to pick-up until current of above normal magnitude is present in any one or more of the three phases being protected. The timing-out of either one of the time-delay circuits causes the circuit breaker trip coil to become energized a predetermined time period after the presence of the above normal current condition. It should be clearly understood that the larger the fault or overload current present, the faster the timing out of the time-delay circuits will occur.

The turning ON of silicon controlled switch Q6 couples a signal to the gate of Q8 and through capacitor C12 to the common terminal 20 between resistor R72, diode D18 and resistor R71, which is shown in FIGURE 1d. Capacitor C12 and resistors R71 and R72 differentiate the signal appearing so as to form a pulse of approximately 10 microsecond duration at the base of transistor Q15 causing transistor Q15 to be momentarily turned ON. Transistor Q15 acts as the means for stepping the programmer circuitry as well as for resetting the programmer circuitry, in a manner to be more fully described.

The programmer 21 is comprised of active elements Q15–Q21 which are silicon controlled switches. Normally, with transistor Q15 in cut-off, the 48 volts across the circuit buses 22 and 23 appears across resistor R74, Zener diode Z6 and resistor R75 to supply a turn ON voltage for silicon controlled switch Q16. When Q16 conducts the voltage between its anode and ground and its anode gate and ground (i.e., bus 23) is very low, i.e., of the order of approximately 1 volt. Since all of the anode terminals of active elements Q16–Q21 are connected in parallel, all of the anode terminals are at this very low voltage level. With the anode gate voltage of active element Q16 being low, the charge developed across capacitor C24 is also very small.

When the momentary pulse is applied to the base electrode of transistor Q15, due to a tripping operation, the momentary conduction of transistor Q15 causes the voltage level between its collector and bus 23 to drop to a level of the order of approximately ½ volt, thereby diverting current flow from silicon controlled switch Q16, causing Q16 to shut OFF. With Q16 being driven into cut-off, its anode gate voltage rises toward the level of the 48 volt bus 22, causing a charge to be developed across capacitor C24 whose charging current flows through resistor R77, thereby generating a voltage drop across the resistor, which voltage drop is impressed between the cathode and cathode gate of silicon controlled switch Q18 and the resultant current flow turns it ON. Silicon controlled switch Q18 will continue to be maintained in the conductive state until another momentary tripping pulse again drives transistor Q15 into conduction. Capacitors C23 and C25 are slow-down capacitors which are employed to slow-down the rate at which the voltage impressed across capacitor C24 rises.

The sequential turn-OFF of silicon controlled switch Q16 and turn-ON Q18 passes current through the anode gate of Q18 to energize the reed relay RR1, for the purpose of operating the cooperating reed relay contacts RR1–1, RR1–2 and RR1–3, in a manner to be more fully described.

Each momentary turn-ON of transistor Q15 operates to sequentially and singularly cause the conduction of the active element chain of the remaining elements Q19–Q21 for the purpose of operating their associated reed relay devices RR2–RR4, respectively. With the eventual energization of active element Q21 the energization of its associated reed relay RR4 causes the closing of its contact set RR4–1, thereby locking in RR4 into the conductive state. The diode D26 connected in series with contact set RR4–1 provides a shunt path from the bus 24 connecting all of the active element anodes Q16–Q21 to the negative potential bus 23 in order to release whatever relay had previously picked up in order to indicate a lock-out condition. The lamp L1 and switch S3 connected in series with diode D26 are provided for the purpose of giving a visual indication of lock-out. Operation of switch S3, which is preferably a push-button switch, will cause energization of lamp L1 in the lock-out condition.

FIGURE 1b contains switch S2 which is a manually operable selective switch for controlling the number of fast time-delay trips desired. Switch S2 is comprised of a manually operable arm rigidly coupled to an arcuate conductive member 26 which is movable together with the positioning of arm 25. A plurality of contact terminals 27–30 are provided which are arranged to make wiping contact with arcuate member 26 with the total number of terminals 27–30 making contact at any given time being dependent upon the position of arm 25. For example, in the position shown in FIGURE 1b it can be seen that all four terminals 27–30 make contact with segment 26. By appropriate positioning of arm 25, it is possible to have less than all the terminals in engagement with segment 26 and to have as few as just terminal 27 in engagement therewith.

Terminal 30 is directly coupled to conductor 31 which, in turn, is coupled through diode D16 to the anode of diode D10. With switch S2 in the position shown, the anode of diode D10 is clamped substantially to ground potential so as to prevent a fast time-delay from timing out. Thus, in the position shown, only the slow time-delay circuit is enabled to time-out in order to energize trip coil 19.

In the next position, shown by dotted line 26', terminal 30 is no longer in contact with segment 26' while the remaining terminals 27–29 remain in contact. With the device in this position, upon the occurrence of the first fault current condition enabling a time-out, the programmer 21 has its active element Q16 energized so that none of the reed relays are energized at this time. Thus, the fast time-delay circuit 17 is enabled to time-out, causing energization of trip coil 19 after the fast time-delay period. After the trip coil is energized and the static recloser control circuit goes to a reclosing sequence which operates in a manner to be more fully described, and assuming the fault current condition to still be present in the distribution system being protected, the programmer will have stepped so as to energize active element Q18 causing its cooperating contact pair RR1–3 to be closed so as to clamp diode D10 to ground, causing the next tripping time-out to occur at a slow time-delay period since the fast time-delay circuit 17 is inhibited. It can clearly be seen that as the programmer active elements Q19 and Q20 are energized, the remaining tripping time delays will al be slow-trip operations due to the clamping of diode D10 to substantially ground potential.

FIGURE 1c shows the circuitry employed for the purpose of performing the reclosing phase of the control circuit operation. The recloser circuitry is comprised of a suitable A.C. source 32 which has a fullwave rectifier diode bridge DB4 and a surge suppressor 33 connected in parallel across the source. The fullwave rectifier bridge places a substantially D.C. voltage across the positive and negative signal buses 34 and 23 for the purpose of energizing the recloser and programming circuits. It should also be understood that the A.C. source 32 and fullwave rectifier DB4 may be replaced by a suitable D.C. voltage supply such as a battery source if desired, and causing no basic change in circuit operation.

Assuming the occurrence of a tripping operation under the control of trip coil 19, the circuit breaker associated therewith (not shown) is tripped to the OPEN position. This circuit breaker is provided with a pair of normally open contacts 35 which are operated to the CLOSED position when the circuit breaker cooperating contacts move to the OPEN position. With the closure of normally open contact pair 35 a current path is established from the source 32 which has been rectified through bus 34, contact pair 35 and switch pairs 36–38, closing coil 39, conductor 40, resistors R46 and R47 to the adjustable recloser circuitry arrangement comprised of resistors R50, R51 and adjustable resistors R52–R54. The toggle switch 41 connected in series with contact pair 35 is a manually operable toggle switch which is in the closed position for automatic operation and which is movable to the open position for manual or test purposes. The voltage appearing through resistors R46, R47 and Zener diode Z4 applies voltage to the reclosing timing circuit 42. The particular recloser timing circuit branch, which is operable at any given time, is controlled by the reed relays RR1–RR3, which are operative under control of the programmer 21, previously described. The operation of the reclosing timing circuit is as follows:

With the occurrence of an overload or fault current condition in any one of the three or more than one of the three phases, A–C, the trip coil 19 is then energized either after time-out of a slow or fast time-delay, as was previously described, with energization trip coil 19 the tripping pulse is applied to programmer 21 causing active element Q16 to become deenergized and active element Q18 to become energized so as to energize reed relay RR1. This causes closure of its associated contact pair RR1–2 establishing the current path through R48, adjustable resistor R52 and contact pair RR1–2 to the emitter of transistor Q9. Transistor Q9 operates as a current regulator whose current is determined by the resistance in its emitter circuit, while the voltage at its base electrode is determined voltage divider circuit comprised of resistors R56 and R58. The voltage drop across the resistors R48, R52 will automatically be controlled to be the same as that developed across resistor R56 through the inherent operation of the transistor. Thus, the base resistance controls the IR drop across R56 controlling the collector current from transistor Q9, thereby in turn, controlling the charging rate of timing capacitor C17 connected in the collector circuit. As soon as the voltage developed across capacitor C17 exceeds the intrinsic stand-off ratio of unijunction transistor Q10 the transistor Q10 conducts, developing a voltage drop across resistor R59, which voltage drop is impressed across the cathode and cathode gate of silicon controlled rectifier Q11. This establishes a current path between positive signal bus 34, switches 35 and 41, close coil 39 and Q11 to negative signal bus 42, thus energizing the closing coil 39 to operate the breaker to the closed position. It should be noted that the current through closing coil 39 is very low before silicon controlled rectifier Q11 turns ON, i.e., it is an insufficient amount of current to properly energize closing coil 39. If desired, as an alternative approach, the terminal 43 may be connected across the terminal 44 and terminal 44 may be disconnected from the anode terminal 45 of silicon controlled rectifier Q11.

The closing of normally open contact pair 35 with the tripping of the breaker also places the charging voltage across capacitor C18 with the voltage developed across capacitor C18 being controlled by Zener diode Z5. With energization of the closing coil 39 the closing of the breaker control by closing coil 39 opens contact pair 35, allowing capacitor C18 to discharge through transistor Q12 at a rate determined by the voltage divider comprised of resistors R65, R66 and emitter resistance R64 and adjustable resistor R63. When the voltage across capacitor C18 drops below the level established at the emitter of transistor Q14 by voltage divider resistors R68 and R69 transistor Q14 turns ON to impress a driving current through resistor R70, diode D18 and resistor R71. The voltage drop developed across resistor R71 acts as a driving source to turn transistor Q15 ON at the end of the reset time which is determined by the value of adjustable resistor R63. With transistor Q14 being ON and turning transistor Q15 ON, the small IR drop across transistor Q15 turns all of the active elements Q16–Q21 of the programmer 21 into cut-off state allowing the capacitors C24, C26, C29 and C32 to charge toward the 48 volt level. The reset of the programmer occurs when the breaker closes and there is no fault on the line, causing the programmer to reset back to the ZERO step again. The reset occurs as was previously described, by virtue of resistor R75 establishing a voltage drop between the cathode and cathode gate of silicon controlled switch Q16, turning it ON, when Q15 turns OFF again because the presence of a fault operates the pick-up circuit and Q3 diverts the reset current.

If, at the time transistor Q14 turns ON, a fault condition is still present on the line, the transistor Q1 shown in FIGURE 1a, will be in the cut-off state since the pick-up voltage level will have been achieved. With transistor Q1 in cut-off, transistor Q2 is driven to cut-off, allowing transistor Q3 to be turned ON by the voltage drop developed across resistor R16 which is coupled between the anode of diode D4 and the collector of transistor Q2 at one end and to the 48 volt D.C. bus 22 at its other end. With transistor Q3 in the conductive state, a shunt path is established between negative signal bus 15 and terminal 46 of capacitor C20 (see FIG. 1c) which is coupled to the collector of transistor Q3 through lead 47, thereby shunting the collector current of transistor Q14 to ground and peventing Q15 from being turned ON and thereby preventing the reset of programmer 21. Thus, if a fault condition is still present in any one of the phases being protected, the programmer is permitted to step to its normal programming cycle, whereas if, after reclosue of the circuit breaker, the fault condition has been cleared, then the programmer will be reset back to its first step in readiness for performing the full gamut of program steps upon the occurrence of the next fault current or overload condition.

The device of the instant invention permits reset to occur in a very brief time interval so as to prevent the possibility of unwanted lock-out from momentary repetitive faults. For example, during a lightning storm a first lightning flash may cause a trip operation. The circuit is then capable of reclosing and resetting the programmer in a very brief period of time (i.e., two circuits or less). A subsequent lightning flash may cause a second tripping operation. This lightning stroke may follow the first lightning stroke very closely in time so that a conventional reclosure system, not having time to trip, close and reset before the occurrence of the second lightning stroke, would jump to the second step of the program whereas the instant invention would not be so handicapped. Thus, a series of such repetitive momentary faults, which could cause lock-out in conventional apparatus, will not cause such a lock-out condition with the arrangement of the instant invention.

The switch means 47 is provided for the purpose of selecting a number of tripping operations which are permitted before lock-out. Switch 48 is comprised of a manually operable rotating arm 49 having an arcuate segment 50 coupled thereto which is movable with arm 49 and which is electrically connected thereto. Making wiping contact with arcuate segment 50 is a plurality of stationary terminals 51–53 each of which are coupled to common bus 54 through a pair of contacts RR1–1, RR2–1 and RR3–1, each being associated with the reed relays RR1–RR3, respectively. These contact pairs are in the normally open state. One end of conductor 54 is coupled to the cathode terminal 55 while the opposite end of conductor 54 is coupled through diode D27 to the cathode gate of silicon controlled rectifier Q11.

With the switch in the position shown in FIGURE 1c, i.e., with the conductive segment making electrical contact with terminals 51–53, the conduction of active element Q18 which energizes reed relay RR1 causes closure of its associated contact pair RR1–1, establishing a current path from negative signal bus 23 through conductor 56, arm 49, segment 50, terminal 53 and contact pair RR1–1 through diode D27 to terminal 57. This provides a direct shunt across the cathode and cathode gate terminals of silicon controlled switch Q11 preventing the switch from becoming conductive and thereby preventing operation of the closing coil 39, and hence a lock-out condition.

Moving the arm 49 and the arcuate segments 50 in the direction shown by arrow 58 to the dotted line position 50′, only terminals 51 and 52 remain in engagement with arcuate segment 50′. Thus, upon the occurrence of the first program step a closing operation is permitted. However, lockout will occur upon the occurrence of the second program step, i.e., when active element Q19 becomes energized, reed relay RR2 is energized closing its associated contact pair RR2–1 so as to shunt the cathode gate of silicon controlled rectifier Q11 to ground and prevent operation of the closing coil 39 upon the occurrence of the second program step. In a like manner, by moving the segment 50 so as to make wiping engagement with only terminal 51, lockout will occur upon reaching the third program step, i.e., the energization of active element Q20 energizing reed relay RR3 to close its associated contact pair RR3–1 in order to prevent a conduction of silicon controlled rectifier Q11.

By moving the arcuate segment 50 still one additional position so that it wiping engages only the disconnected terminal 59, the programmer 21 is permitted to step through all of its program steps until active element Q21 becomes energized thus establishing a shunt path through either active element Q21 or contact pair RR4–1 and conductor 54 and diode D27 to terminal 57 so as to prevent energization of silicon controlled rectifier Q11 thereby providing lock-out when the programmer reaches its final program step.

The energization of each of the reed relays RR1–RR3 during the associated program steps 2, 3 and 4, also causes closure of the associated contact pairs RR1–2, RR2–2 and RR3–2 for the purpose of altering the amount of resistance in the emitter circuit of transistor Q9 and hence reducing the charging rate of capacitor C17 which, in turn, lengthens the elapsed time interval before operation of the closing coil 39. In addition to altering the time duration by virtue of operation of the programmer 21, the amount of time delay is further made adjustable by virtue of the adjustable resistance means R52, R53 and R54. If desired, the time delays may be shortened for incrasing program steps and the final arrangement desired is dependent only upon the needs of the user.

11

An alternative embodiment for the reclosing and reset timing circuit of FIGURE 1c is shown in FIGURE 3. As previously described, the alternative embodiment of FIGURE 3 may be comprised of an A.C. signal source 32' fullwave rectified by the diode bridge DB4'. If desired, the circuit 60 of FIGURE 3 may also be powered by a suitable D.C. source.

Operation of the reclose and reset timing circlit 60 is initiated, as before, by closure of contact set 35' which occurs as soon as the circuit breaker is being protected or any one of them moved to the open position. A charging path will then exist from the source through bus 61 and one of the branches 62–64 to capacitor C1 which begins to charge toward the control voltage. The branches 62–64, only one of which will be closed at any given time, are under control of the reed relay contact pairs RR1–2, RR2—2 and RR3–2, which operate under control of the programmer 21 of FIGURE 1d in the same manner as was previously described.

When the voltage across capacitor C1 reaches the firing level of neon lamp L2, lamp L2 will start to conduct. The difference between the firing and conduction voltage of the neon lamp is approximately 10 volts. This voltage is impressed across resistor R6 establishing a voltage drop across the cathode and cathode gate terminals of silicon controlled rectifier Q22. The conduction of silicon controlled rectifier Q22 establishes a current path from bus 61 through diode D1, closed coil 39' and silicon controlled rectifier Q22 to negative signal bus 42', thereby causing closure of the circuit breaker being so controlled.

Simultaneously therewith capacitor C1 is discharged through diode D2 and resistor R4 in readiness for a subsequent reclose timing cycle. Resistor R4 is provided for the purpose of limiting the magnitude of the capacitor discharge current.

During the time at which the reclose timing capacitor C1 is charging, the peak voltage at the silicon controlled rectifier Q22 is coupled to reset capacitor C2 through diode D3 and resistor R5. Thus, capacitor C2 is charged with the maximum voltage appearing at the anode of the SCRQ22. This causes the base of transistor Q6 to be reverse bias relative to its emitter voltage which is fixed by the voltage divider comprised of resistors R31 and R32. Diode D4 protects transistor Q6 from excessive reverse to base emitter voltage. Conduction of SCRQ22 reverse biases diode D3 making the only discharge path for capacitors C2 that of adjustable resistor R7. When capacitor C2 discharges to a voltage lower than that at the emitter electrode of transistor Q6, transistor Q6 will conduct so as to turn ON transistor Q15 (see FIG. 1d) for program reset, in the same manner as was previously described.

If desired, the neon lamp L2, provided in the reclosed timing circuit, can be replaced by a four-layer semiconductor trigger diode and will function in essentially the same manner.

FIGURE 4 is a block diagram, showing in greatly simplified form, the significant building blocks of the system of FIGS. 1a–1d. The block diagram 100 is comprised of current sensors 101 (one for each phase being protected) which establish a D.C. voltage level for the current magnitude flowing in the phases. Pick-up circuit 102 simultaneously enables the long and short time-delay circuits 103 and 104 respectively, when current of above a predetermined magnitude is detected. At least one of these circuits 103 or 104 will be permitted to time-out to enable trip circuit 105 to operate the magnet latch 106 to trip a circuit interrupter 107 and simultaneously to step programmer 108 to the next program step.

With tripping of circuit interrupter 107 to the open state, the close circuit 110, which is coupled to the circuit interrupter 107 through the mechanical path 109, becomes operative and under control of the reclose timing circuit 111 and controls the time duration elapsed before the energization of the closing coil. This operation is coupled through the connecting path 112 to circuit interrupter 107.

Simultaneously therewith, closed circuit 110 enables the reset timing circuit 113 to time-out, causing reset circuit 114 to be enabled for the purpose of resetting programmer 108. If a fault is still present in the line after a reclosure operation, pick-up circuit 102 is coupled through path 115 to disable reset circuit 114 from resetting programmer 108. Switch means 116 controls the number of fast time-delay operations which will be provided by short time-delay circuit 104, while switch means 117 controls the number of reclosing operations which will occur before lock-out condition is reached.

It can clearly be seen from the foregoing that the instant invention provides a novel solid state control circuitry for tripping a circuit interrupter with the energy of the fault current alone after either a short or fast time delay, as well as providing for reclosure of the circuit interrupter so tripped after a predetermined time interval, as well as providing a preselectable program for controlling the number of short and fast trips as well as the number of reclosing operations that will be permitted before lock-out condition is achieved. Means are also provided for resetting the control circuit programmer as soon as a fault has been cleared as well as for preventing resetting of the programmer if a fault condition still exists on the line after a reclosing operation has occurred. The total control package is environmentally stable, avoids the need for tripping batteries which are temperature limited as well as the need for electromechanical relays having exposed contacts which are subject to corrosion. All semiposed semiconductors are used in highly degenerative or switching mode circuits and the standby current drain is relatively small. The total control packages have already been constructed and successfully tested and have been capable of being positioned within housings having dimensions of height—15 11/16", width—10 3/8" and depth—4 3/16", making them extremely practical for use in a wide variety of protective circuit arrangements.

In instances where it is desired to first place the reclosure of FIGURE 2 into operation with a load circuit or where it is desired to first couple a new load into the circuit switch means 80 and 81 are provided for the purpose of providing for a change in the instantaneous time circuit curve to permit what is commonly referred to as "cold load" pick-up. The operation of the "cold load" pick-up circuit is as follows:

When it is desired to direct a load circuit on to the line a suitable push button or other manually operable lever (not shown) is depressed to operate normally open switches 80 and 81 (see FIGURES 1a and 1c, respectively) to the closed position. While it is not shown in FIGURES 1a and 1c, normally open switch pairs 80 and 81 are preferably mechanically linked so that the depression of a single contact push button (or lever) will operate both contact pairs simultaneously.

Closure of contact pair 80 couples diode D2 across resistor R11 effectively removing this resistor from the voltage divider circuit coupled to the base of transistor Q1. This causes the pick-up level for transistor Q1 to increase markedly so that a pick-up voltage of a much greater magnitude than is normally encountered will be required before the pick-up circuit transistor Q1 will enable either of the timing circuits 16 or 17 to time-out. This is necessary since the in-rush current to a "cold load" is usually quite high and is not an abnormal condition when such a load is initially placed on line.

Closure of switch 80 couples diode D17 across the anode of diode D10 and negative signal bus 15 to prevent time out of the fast timing circuit 17 so that even if the newly established pick-up current level is detected only the slow time delay circuit 16 will be permitted to time out during cold load pick-up.

The closure of contact pair 81 places a short-circuit directly across silicon controlled rectifier Q11 causing closed coil 39 to be energized for the purpose of closing the circuit breaker (not shown) which couples the load to the power distribution system. Typically, the push button or lever is held depressed for a period of approximately ten seconds to provide for cold load pick-up. Release of this push button or lever causes return of the contact pairs 80 and 81 to their normally open positions, thereby deenergizing closed coil 39 and reestablishing normal pick up level at the base electrode of transistor Q1.

Although there has been described a preferred embodiment of this novel invention, many variations and modifications will now be apparent to those skilled in the art. For example, while the circuitry of FIGURES 1a–1d and 3 teaches the use of semiconductors, transistors, silicon controlled rectifiers and switches (commonly referred to as thyristors) it should be understood that any other suitable active elements may be employed. Therefore, this invention is to be limited, not by the specific disclosure herein, but only by the appending claims.

What is claimed is:

1. Means for providing selective tripping and reclosing operations of circuit interrupters employed in power distribution networks, comprised of at least a single phase arrangement, current sensing means inductively coupled to each phase of the power distribution network for developing a substantially D.C. voltage proportional to the magnitude of current flowing in the associated phase of the power distribution network;

first and second time delay circuits coupled to said current sensing means for generating a signal of a first predetermined magnitude after a time delay of predetermined length;

said first and second time delay circuits providing time delays of differing lengths before reaching said first predetermined magnitude;

a pick-up circuit coupled between said time delay circuits and said current sensing means for disabling said time delay circuits until the current in the power dstribution network reaches a second predetermined magnitude;

a normally disabled tripping circuit coupled to the outputs of said first and second time delay circuits and being enabled thereby for tripping an associated circuit breaker under control of the time delay circuit which first achieves said second predetermined magnitude;

first means controlled by said tripping circuit for selectively disabling the time delay circuit having the shorter time delay period after a predetermined number of tripping operations;

2. The apparatus of claim 1 further comprising a normally deenergized reclosing circuit including means for energizing said reclosing circuit when its associated circuit breaker is tripped to the open position;

said reclosing circuit including third time delay means for generating a signal of a predetermined magnitude at a predetermined time after energization of the reclosing circuit;

closing coil means coupled to said third time delay circuit being energized by the output thereof for reclosing its associated circuit breaker a predetermined time period after tripping thereof;

said first means including means for selectively adjusting the time delay of said third time delay circuit after a predetermined number of tripping operations.

3. The apparatus of claim 1 wherein said first means is comprised of programming means coupled to said tripping circuit for maintaining a count of the number of tripping operations which have occurred;

said programming means being coupled to said time delay circuits for adjustably selecting the number of fast time delay trips desired.

4. The apparatus of claim 2 further comprising lockout means coupled between said pick-up circuit and said reclosing circuit to disable said reclosing circuit when a critical current condition still exists in said power distribution network after reclosure of its associated circuit interrupter.

5. The apparatus of claim 3 further comprising a reclosing circuit, a normally deenergized reclosing means including means for energizing said reclosing circuit when its associated circuit breaker is tripped to the open position;

said reclosing circuit including third time delay means for generating a signal of a predetermined magnitude at a predetermined time after energization of the reclosing circuit;

closing coil means coupled to said third time delay circuit being energized by the output thereof for reclosing its associated circuit breaker a predetermined time period after tripping thereof;

said programming means including means for selectively adjusting the time delay of said third time delay circuit.

6. The apparatus of claim 5 further including means coupling said programming means to said reclosing means to reset said programming means after a reclosure operation has occurred and no critical current condition exists in the power distribution network.

7. The apparatus of claim 3 wherein said programmer is comprised of a plurality of active elements being coupled in cascade;

means coupled in parallel with all of said active element stages and with said tripping circuit for deenergizing any active element stage which may be energized, upon the occurrence of a tripping pulse;

plural means each being coupled between the output of one active element stage and the input of the next active element stage for energizing a subsequent active element stage when the prior active element stage has been disabled;

plural switch means each being coupled to an associated active element stage;

each of said switch means having a first and second pair of contacts electrically coupled into said first switch means and second reclosing means respectively, for automatically altering the tripping time delay and the reclosing time delay intervals as said programming means steps through its program cycle.

8. The apparatus of claim 7 wherein said plural switch means are reed relay switches.

9. The apparatus of claim 7 wherein said active element stages are thyristors each having their anode and anode gate electrodes connected across said coupling means and their cathode and anode electrodes coupled across the output of said disabling means.

10. The apparatus of claim 2 wherein said reclosing means is comprised of a local power source;

a reclosing timing circuit including semiconductor means having a plurality of resistive branches coupled in electrical parallel between said power source and a first electrode of said semiconductor;

a charging capacitor coupled to a second electrode of said semiconductor means;

a normally deenergized gating circuit having its input and output coupled to said charging capacitor and said closing coil, respectively, for energizing said closing coil when the voltage across said charging capacitor reaches a predetermined amplitude.

11. The apparatus of claim 10 further comprising programming means coupled to said tripping circuit for maintaining a count of the number of tripping operations which have occurred;

said programming means being comprised of a plurality of active elements coupled in cascade;

means coupled in parallel with all of said active element stages and with said tripping circuit for deenergizing any active element stage which may be energized, upon the occurrence of a tripping pulse;

plural means each being coupled between the output of one active element stage and the input of the next active element stage for energizing a subsequent active element stage when the prior active element stage has been disabled;

plural switch means each being coupled to an associated active element stage, each of said switch means having a pair of normally open contacts under control of said switch means and being coupled in an associated resistive branch of said reclosing timing circuit;

said switch contacts being selectively operable under control of said programming means for selectively changing the reclosing time delay for subsequent reclosing operations.

References Cited
UNITED STATES PATENTS

| | | | |
|---|---|---|---|
| 2,329,081 | 9/1943 | Reagan et al. | 317—22 |
| 3,214,641 | 10/1965 | Sonnemann | 317—36 |
| 3,334,272 | 8/1967 | Lipnitz | 317—36 |

LEE T. HIX, *Primary Examiner.*

R. V. LUPO, *Assistant Examiner.*

U.S. Cl. X.R.

317—36

PO-1050
(5/69)

UNITED STATES PATENT OFFICE
CERTIFICATE OF CORRECTION

Patent No. 3,416,035          Dated December 10, 1968

Inventor(s) James W. Lipnitz

It is certified that error appears in the above-identified patent and that said Letters Patent are hereby corrected as shown below:

Column 1, line 17, "circuit" should be --circuits--. Column 2, line 1, "fourth" should be --forth--. Column 8, line "al" should be --all--. Column 9, line 54, "peventing" should --preventing--; column 9, line 58, "reclosue" should be --reclosure--; column 9, line 70, "circuits" should be --cycles- Column 10, line 7, "47" should be --48--; column 10, line 53, "wiping" should be --wipingly--. Column 13, line 46, "second" should be --first--; column 13, line 51, the semi-colon ";" should be a period --.--.

SIGNED AND
SEALED
MAY 26 1970

(SEAL)
Attest:

Edward M. Fletcher, Jr.
Attesting Officer

WILLIAM E. SCHUYLER, JR.
Commissioner of Patents